United States Patent [19]

Nickel et al.

[11] Patent Number: 4,539,009
[45] Date of Patent: Sep. 3, 1985

[54] DYESTUFF MIXTURE

[75] Inventors: Horst Nickel; Hans-Günter Otten, both of Leverkusen, Fed. Rep. of Germany

[73] Assignee: Bayer Aktiengesellschaft, Leverkusen, Fed. Rep. of Germany

[21] Appl. No.: 667,525

[22] Filed: Nov. 2, 1984

[30] Foreign Application Priority Data

Nov. 8, 1983 [DE] Fed. Rep. of Germany ....... 3340272

[51] Int. Cl.³ .......................... C09B 67/22; D06P 1/06
[52] U.S. Cl. ........................................... 8/641; 8/681; 8/687; 8/917; 8/924
[58] Field of Search ............................................. 8/641

[56] References Cited

U.S. PATENT DOCUMENTS

| 3,862,119 | 1/1975 | Stingz | 260/186 |
| 3,932,378 | 1/1976 | Fasciati | 8/681 |
| 3,951,590 | 4/1976 | Studer | 8/681 |

FOREIGN PATENT DOCUMENTS 1201546 8/1970 United Kingdom .

Primary Examiner—A. Lionel Clingman
Attorney, Agent, or Firm—Sprung Horn Kramer & Woods

[57] ABSTRACT

Mixtures of dyestuffs of the formula I

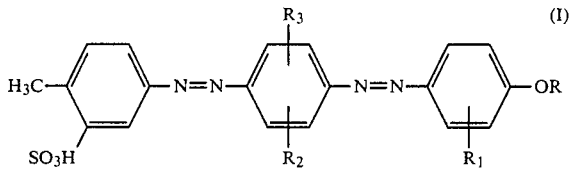

and of the formula II

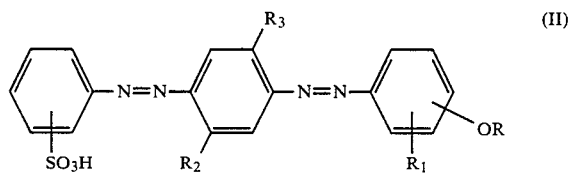

wherein
 $R$ = alkyl,
 $R_1$ = H or R and
 $R_2/R_3$ = $R_1$ or alkoxy, are distinguished by being readily soluble in hard water and produce satisfactory golden yellow dyeings on polyamide fibres.

5 Claims, No Drawings

DYESTUFF MIXTURE

The invention provides a mixture of disazo dyestuffs which, in the form of the free acid, have the formula

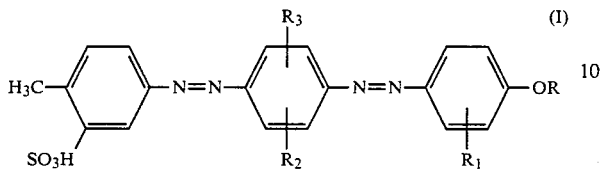 (I)

and disazo dyestuffs which, in the form of the free acid, have the formula

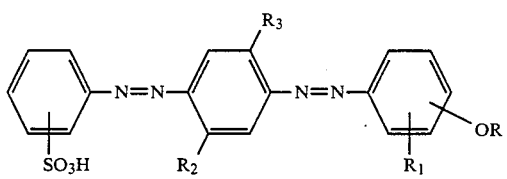 (II)

The symbols in these formulae are defined as follows, independently of one another:

R = optionally substituted alkyl,
$R_1$ = H or alkyl and
$R_2$ nd $R_3$ = H, alkyl, or alkoxy.

The alkyl groups R can have 1 to 4C atoms and can, if desired, also contain further substituents, such as hydroxyl and/or $C_1$–$C_4$-alkoxy.

Specific examples are $CH_3$, $C_2H_5$, $C_2H_4OH$, $C_3H_7$, $C_4H_9$, $C_3H_6OH$ and $C_4H_8OH$.

Otherwise suitable alkyl and alkoxy radicals have 1–4C atoms, and they are preferably methyl, methoxy or ethoxy.

Preferred disazo dyestuffs of the formula I have the formula

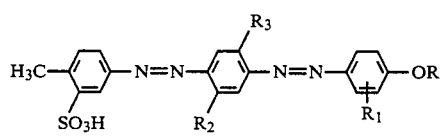 (Ia)

wherein R, $R_1$, $R_2$ and $R_3$ as defined above.

Of these, particularly preferred dyestuffs have the formula

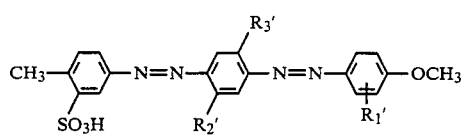 (Ib)

wherein
$R_1'$ = H or $CH_3$,
$R_2'$ = H or $CH_3$ and
$R_3'$ = $CH_3$ or $OCH_3$.

Preferred dyestuffs of the formula II have the formula

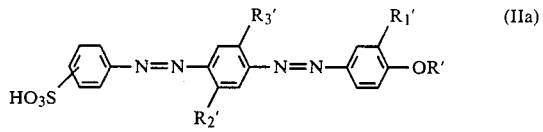 (IIa)

wherein
$R_1'$–$R_3'$ are as defined above and
R' denotes alkyl, ethyl, β-hydroxyethyl, β-hydroxypropyl or β-hydroxy-n-butyl and
the sulphur group is in the m- or p-position relative to the azo bridge.

Particularly preferred mixtures consist of the dyestuffs of the formulae

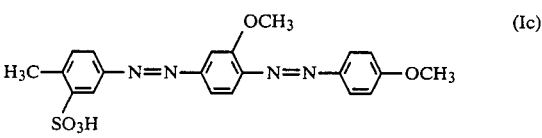 (Ic)

and

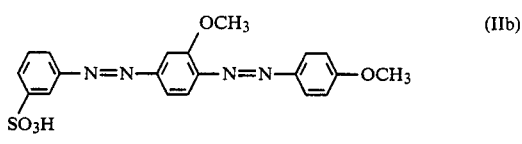 (IIb)

or

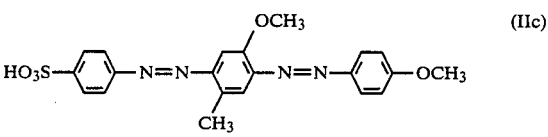 (IIc)

Suitable mixing ratios of dyestuffs I and II are 20–60% to 80–40%. The ratio of 40 to 60% (% being % by weight) is preferred.

The dyestuffs can of course also be in the form of their salts.

Suitable cations for these salts are alkali metal ions, such as sodium, potassium or lithium ions, or ammonium ions, such as $NH_4$, monoalkylammonium, dialkylammonium, trialkylammonium, hydroxyalkylammonium or alkoxyalkylammonium, these alkyl radicals likewise having 1–4C atoms.

It is also possible to use mixed salts (for example Na/Li or Na/K or Na/ammonium) of the new dyestuffs.

The dyestuffs of the formula (I) are prepared by methods known per se (cf. for example, U.S. Pat. Nos. 3,862,119 and 3,951,590 and British Patent Specification No. 1,201,546) by alkylating the hydroxy compounds of the formula

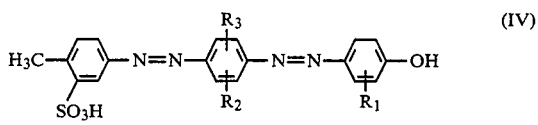 (IV)

which are accessible in conventional manner by diazotisation, coupling and, if necessary, hydrolysis of the monoazo compound.

Customary alkylating agents are suitable. Examples thereof are alkyl halides, such as methyl chloride, methyl bromide or ethyl chloride, alkylene oxides, such as ethylene oxide, propylene oxide or butylene oxide, and sulphonic acid esters, such as dimethyl sulphate, diethyl sulphate, methyl benzenesulphonate or methyl toluenesulphonate.

The hydroxy compound (IV) is alkylated with said alkylating agents in conventional manner, for example in an aqueous alkali medium or an aqueous organic mixture (for example water-ethanol or -propanol or -isopropanol) within the alkaline pH range.

The dyestuffs of the formula II are also known per se (cf. DE-A 2,142,412).

The new dyestuff mixtures are particularly suitable for dyeing and printing natural and synthetic amide-containing fibre materials, in particular nylon fibres of different provenances. They are of high tinctorial strength and are distinguished by very good colouristic properties.

Noteworthy is their excellent compatibility with many commercially available nylon dyestuffs and the high fastness level (especially wet fastness properties and light fastness, which are even retained in combination shade dyeings). It is particularly significant that the dyestuffs are readily soluble and that their dyestuff solutions are stable, even in hard water.

The parts in the following examples are parts by weight.

EXAMPLE 1

0.1 mole (42.6 g) of the disazo dyestuff of the formula

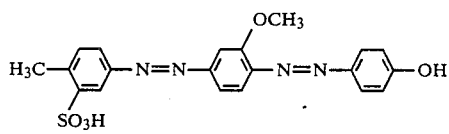

-prepared by coupling diazotised 4-aminotoluene-2-sulphonic acid with 2-amino-anisole-N-methanesulphonic acid, splitting off the methanesulphonic acid under alkaline conditions, further diazotising the aminoazobenzenesulphonic acid and alkaline coupling with phenol—is dissolved at 50° C. in 300 parts of water brought to pH 11 with sodium carbonate. 42 parts by volume of dimethyl sulphate are added dropwise at 50° C. and pH 9-11 with vigorous stirring while 20% strength sodium hydroxide solution is added simultaneously, until the methylation of the hydroxyl group is complete, which can be monitored by paper chromatography. The methylated dyestuff will have been partially precipitated. To isolate it, the mixture is neutralised with hydrochloric acid, and the precipitate is filtered off with suction. The paste obtained is dried and ground. This gives a dark powder which gives a yellow solution in water. The dyestuff dyes nylon 6 fibres in golden yellow shades (C.I. hue no. 4) $\lambda_{max}$ 384 nm.

If the methylation described above is carried out not in a medium rendered alkaline with sodium carbonate but in the presence of lithium hydroxide, this affords, on isolation by salting out with lithium chloride and drying, a dark powder which is readily soluble in water.

If the methylation is carried out in the presence of lithium hydroxide and the product is isolated by spray-drying from a neutral medium, this likewise produces a readily water-soluble dyestuff powder.

If the starting material used is the disazo dyestuff where o-cresol is the phenolic end component, this, on methylation, leads to a dyestuff which dyes nylon in golden yellow shades ($\lambda_{max}$ 396 nm).

The methylated disazo dyestuff having m-cresol as the end component dyes nylon in a slightly more reddish golden yellow shade ($\lambda_{max}$ 400 nm).

If the starting material is the mixture of the disazo dyestuffs where phenol and o-cresol and/or m-cresol are the end components in a ratio of 1:1 to 3:1, this, on methylation, produces readily soluble dyestuffs which dye nylon in golden yellow shades.

If the phenol disazo dyestuff is alkylated not with dimethyl sulphate but with an equimolar amount of diethyl sulphate, this produces a dyestuff which dyes nylon in golden yellow shades ($\lambda_{max}$ 395 nm).

If the alkylating agent used is not dimethyl sulphate but methyl chloride and the reaction is carried out in a sealed system, this produces the same dyestuff as described above.

The following table lists further dyestuffs which are prepared as indicated above; the first column gives the middle component, the second column the end component, and the other columns the alkyl radical and the hue of a nylon 6 dyeing as categorised with the Colour Index hue indication number.

| Middle component | End component | Alkyl radical | Hue | C.I. hue indication no. |
|---|---|---|---|---|
| 2,5-dimethoxy (OCH3, CH3) | Phenol | —CH3 | orange | 4–5 |
| " | Phenol | —C2H5 | " | 4–5 |
| " | o-cresol | —CH3 | " | 4–5 |
| " | m-cresol | —CH3 | " | 4–5 |
| CH3, OCH3 | Phenol | —CH3 | golden yellow | 4–(5) |
| " | m-cresol | —CH3 | golden yellow | 4 |
| OCH3-phenyl | Phenol | —CH3 | golden yellow | 4 |
| " | o-cresol | —CH3 | golden yellow | 4 |
| CH3-phenyl | Phenol | —CH3 | reddish yellow | 4 |
| phenyl | Phenol | —CH3 | slightly reddish yellow | (3)–4 |

EXAMPLE 2

A textured nylon 6 fabric is dyed in a liquor ratio of 50:1 with a dyeing liquor containing 0.25% of a 40/60 mixture of dyestuffs Ic and IIc (in the form of the sodium salts) and 2 g of ammonium acetate per liter plus acetic acid up to pH 5. The dyeing is carried out at 98° C. for 60 minutes. The dyed piece of fabric is then rinsed and dried. The result is a perfectly level, deep golden yellow dyeing.

EXAMPLE 3

(hardness sensitivity test)

0.25 g of dyestuff is dissolved in 1 liter of water of 10° of German hardness, and the solution is inspected for possible precipitates over a period of 48 hours:

| (a) | 100 parts of dyestuff of the formula IIc | Sedimented within 12 hours |
| --- | --- | --- |
| (b) | 60 parts of dyestuff of the formula IIc 40 parts of dyestuff of the formula Ic | Unchanged after 48 hours |
| (c) | 100 parts of dyestuff of the formula Ic | Sedimented within 1 hour |

EXAMPLE 4

(solution stability test)

5 g of dyestuff are dissolved in 1 liter of soft water and the solution is inspected for possible precipitates over a period of 48 hours.

| (a) | 100 parts of dyestuff of the formula IIc | Unchanged after 48 hours |
| --- | --- | --- |
| (b) | 60 parts of dyestuff of the formula IIc 40 parts of dyestuff of the formula Ic | Unchanged after 48 hours |
| (c) | 100 parts of dyestuff of the formula Ic | Sedimented within 18 hours |

We claim:

1. Mixture of disazo dyestuffs which, in the form of the free acid, have the formula

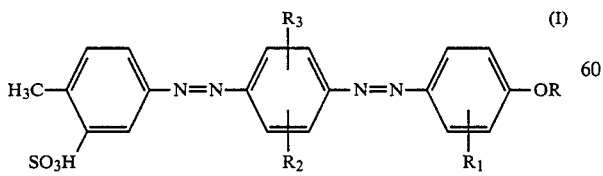

and disazo dyestuffs which, in the form of the free acid, have the formula

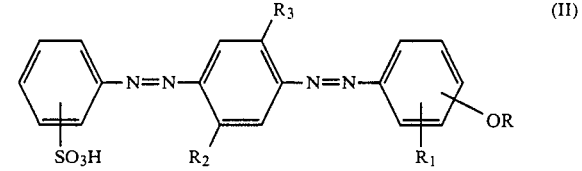

wherein, independently of each other,
R denotes optionally substituted alkyl,
$R_1$ denotes H or alkyl and
$R_2$ and $R_3$ each denote H, alkyl or alkoxy the mixture comprising 20–60% by weight of dyestuff I and 80–40% by weight of dyestuff II.

2. Mixtures of disazo dyestuffs according to claim 1, characterised in that
R denotes optionally OH— or $C_1$-$C_4$-alkoxy-substituted $C_1$-$C_4$-alkyl,
$R_1$ denotes H or $C_1$-$C_4$-alkyl, and
$R_2$ and $R_3$ each denote H, $C_1$-$C_4$-alkyl or $C_1$-$C_4$-alkoxy.

3. Mixtures of disazo dyestuffs of the formula

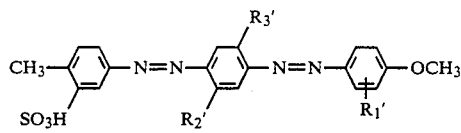

wherein
$R_1'$ denotes H or $CH_3$,
$R_2'$ denotes H or $CH_3$ and
$R_3'$ denotes $CH_3$ or $OCH_3$
and disazo dyestuffs of the formula

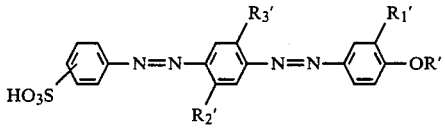

wherein
$R_1'$–$R_3'$ are as defined above,
R denotes methyl, ethyl, β-hydroxyethyl, β-hydroxypropyl or β-hydroxy-n-butyl and
the sulpho group is in the m- or p-position relative to the azo bridge.

4. Mixtures of disazo dyestuffs of the formulae

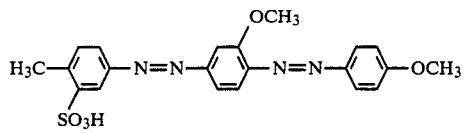

and

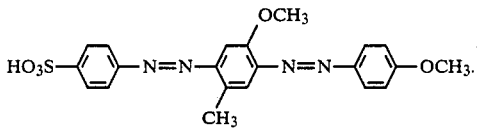

5. Process to dye amide-containing fibres which comprises using a dyestuff mixture according to claim 1.

* * * * *